(12) United States Patent
Urushidani et al.

(10) Patent No.: US 9,452,575 B2
(45) Date of Patent: Sep. 27, 2016

(54) LABELED CONTAINERS AND PROCESSES FOR PRODUCING

(75) Inventors: Yukihiro Urushidani, Webster Groves, MO (US); Kazuhiro Kurosaki, Tokyo (JP); Shinji Tai, Pasadena, TX (US); Masakazu Nakaya, Pasadena, TX (US)

(73) Assignees: Nestec S.A., Vevey (CH); Kuraray Co. Ltd., Tokyo (JP)

( * ) Notice: Subject to any disclaimer, the term of this patent is extended or adjusted under 35 U.S.C. 154(b) by 688 days.

(21) Appl. No.: 13/808,684

(22) PCT Filed: Jul. 5, 2011

(86) PCT No.: PCT/US2011/001178
§ 371 (c)(1),
(2), (4) Date: May 22, 2013

(87) PCT Pub. No.: WO2012/005761
PCT Pub. Date: Jan. 12, 2012

(65) Prior Publication Data
US 2013/0264743 A1 Oct. 10, 2013

Related U.S. Application Data

(60) Provisional application No. 61/399,265, filed on Jul. 9, 2010.

(51) Int. Cl.
*B29D 22/00* (2006.01)
*B65D 81/26* (2006.01)
(Continued)

(52) U.S. Cl.
CPC ....... *B29D 22/003* (2013.01); *B29C 45/14688* (2013.01); *B29C 45/14* (2013.01); *B29C 45/1642* (2013.01); *B29C 2045/14918* (2013.01); *B32B 7/02* (2013.01); *B65D 81/267* (2013.01)

(58) Field of Classification Search
CPC ....... B32B 7/02; B29D 22/003; B29C 45/14; B29C 45/1642; B29C 2045/14918; B65D 81/267
USPC .................... 264/279, 509; 220/62.21, 62.22
See application file for complete search history.

(56) References Cited

U.S. PATENT DOCUMENTS 6,524,672 B1   2/2003   Slat et al.
6,599,598 B1   7/2003   Tai et al.
(Continued)

FOREIGN PATENT DOCUMENTS

CN   1654536 A   8/2005
EP   1950251 A1   7/2008
(Continued)

OTHER PUBLICATIONS

JP2004155483A Machine Translation JAP to ENG of the disclosure, Sep. 8, 2015.*
(Continued)

*Primary Examiner* — Alison L Hindenlang
*Assistant Examiner* — Lawrence D Hohenbrink, Jr.
(74) *Attorney, Agent, or Firm* — Ronald A. Burchett; Julie M. Lappin

(57) ABSTRACT

The invention provides novel processes for producing in-mold labeled containers and the containers produced using such processes. The processes involve setting a multilayered label having an oxygen barrier layer into a mold and injecting a melted resin suitable for forming a container into the mold. The process forms a container with an oxygen barrier layer. In preferred embodiments, the multilayered label has at least an oxygen absorbing resin layer containing ethylene-vinyl alcohol copolymer and an oxygen absorbent and the container is retortable.

15 Claims, 2 Drawing Sheets

(51) Int. Cl.
*B32B 7/02* (2006.01)
*B29C 45/14* (2006.01)
*B29C 45/16* (2006.01)

(56) References Cited

U.S. PATENT DOCUMENTS

| | | |
|---|---|---|
| 7,608,340 B2 | 10/2009 | Tsuji et al. |
| 2003/0022974 A1 | 1/2003 | Tai et al. |
| 2003/0067099 A1 | 4/2003 | Miller et al. |
| 2005/0079306 A1 | 4/2005 | Koyama et al. |
| 2007/0243351 A1 | 10/2007 | Tai et al. |
| 2008/0069990 A1* | 3/2008 | Augestad ............ B29C 45/0001 428/35.8 |
| 2009/0061061 A1* | 3/2009 | Beckwith .............. A23L 3/3436 426/546 |
| 2009/0169902 A1 | 7/2009 | Inubushi et al. |
| 2010/0047496 A1 | 2/2010 | Teensma et al. |
| 2010/0086755 A1 | 4/2010 | Sumi et al. |

FOREIGN PATENT DOCUMENTS

| | | | |
|---|---|---|---|
| JP | 11226997 A | | 8/1999 |
| JP | 2002120848 A | | 4/2002 |
| JP | 2004155483 A | * | 6/2004 |
| JP | 2006150979 A | | 6/2006 |
| JP | 2007238105 A | | 9/2007 |
| WO | 0218489 A1 | | 3/2002 |
| WO | 2007003791 A1 | | 5/2007 |
| WO | 2009007453 A1 | | 1/2009 |

OTHER PUBLICATIONS

Kojima PP moisture vapor transmission rate 30.*
Kojima PP moisture vapor transmission rate 40.*
International Search Report, Application No. PCT/US2011/001178 dated Nov. 17, 2011.
Extended European Search Report, Application No. 11 803 936.1 dated Nov. 12, 2014.

* cited by examiner

--PRIOR ART--

--PRIOR ART--

LABELED CONTAINERS AND PROCESSES FOR PRODUCING

CROSS REFERENCE TO RELATED APPLICATIONS

This application is a national stage application under 35 USC §371 of PCT/US2011/001178, filed on 5 Jul. 2011 and claims priority to U.S. Provisional Application No. 61/399,265 filed on 9 Jul. 2010, the disclosures of which are incorporated herein by this reference.

BACKGROUND OF THE INVENTION

1. Field of the Invention

The invention relates generally to labeled containers and particularly to in-mold labeled containers and processes for producing in-mold labeled containers that limit the transmission of oxygen into the containers.

2. Description of Related Art

Methods for attaching labels to containers, including plastic containers, are known in the art. For example, methods for applying adhesive agents onto the rear surface of labels and then adhering the labels onto plastic containers are known to skilled artisans. Also, in-mold labeled (IML) methods have been used for attaching labels to containers. For example, US20100001010A1 discloses an in-mold labeled container and molding process for making the container. U.S. Pat. No. 5,604,006 discloses an in-molding label process that works by adhering a label to a thermoplastic substrate in a mold cavity and injecting molten thermoplastic resin to press the label and recess it into the thermoplastic substrate. U.S. Pat. No. 4,913,643 discloses a plastic mold useful for in-mold labeling. In typical IML processes, a label is placed in a mold and then plastic is injected into the mold. The result is a plastic container with an integrated label. Plastic containers produced using IML methods can be used for a variety of purposes, e.g., a container for various foods, beverages, and the like.

Some foods and other articles need to be isolated in a container so that they do not interact with oxygen in the environment. One way to prevent such an interaction is to include an oxygen barrier in the container design. For example, Japanese Registered Utility Model No. 3024995 discloses a container wherein a label having an oxygen barrier property is bonded to a container outer wall. U.S. Pat. No. 7,608,340 discloses a container containing a layer that includes an oxygen absorbing resin containing an ethylene vinyl alcohol copolymer (EVOH) and an oxygen absorbent. Similarly, U.S. Pat. No. 7,588,157 discloses an IML container wherein a label having a barrier layer including EVOH is used to give an oxygen barrier property to the label. In addition, many products need to be packaged in a container that can be retorted during the manufacturing process.

However, the labels currently used to produce IML containers are relatively thin because the oxygen barrier layer cannot be thick if made using available methods. As a result, the oxygen barrier property of such IML containers is insufficient for keeping oxygen out of the container. Furthermore, the oxygen barrier property of these labels is adversely affected by humidity and relatively high temperatures. As a result, known IML containers made using these labels cannot be used when the products must be retorted.

There is, therefore, need for new IML containers that have good oxygen barrier properties and that can be retorted if needed.

SUMMARY OF THE INVENTION

It is, therefore, an object of the invention is to provide processes for producing in-mold labeled containers that have an oxygen barrier.

In is another object of the invention to provide in-mold labeled containers that have an oxygen barrier.

In is a further object of the invention to provide in-mold labeled containers that that have an oxygen barrier and that are retortable.

One or more of these or other objects can be achieved using novel processes for producing in-mold labeled containers. Such processes comprise setting a multilayered label having an oxygen barrier layer into a mold and injecting a melted resin suitable for forming a container into the mold. The process forms a container with an oxygen barrier layer. In preferred embodiments, the multilayered label has at least an oxygen absorbing resin layer containing ethylene-vinyl alcohol copolymer and an oxygen absorbent.

Other and further objects, features, and advantages of the present invention will be readily apparent to those skilled in the art.

DETAILED DESCRIPTION OF THE INVENTION

Definitions

Figure 1:
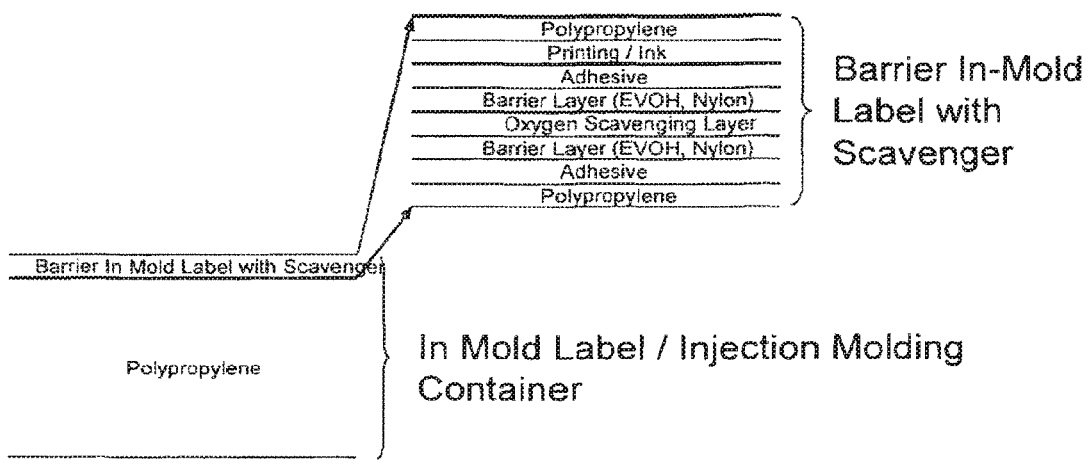
FIG. 1 illustrates an embodiment of the invention and shows the structure of barrier IML label having an oxygen scavenger.

The term "multilayered label having (or comprising) (at least) an oxygen absorbing resin layer" refers to label having plural layers at least one of which is an oxygen absorbing resin layer. This label further includes thereon an indicium or indicia such as writing, letters symbols, designs, markings, etc. viewable on the label itself, and preferably viewable when incorporated in the in-mold labeled container. Such indicium or indicia can be conferred by printing ink, etc. When the indicium or indicia is not present the construct is referred to as a "multilayered sheet having at least an oxygen absorbing resin layer."

The term "layer" refers to a single, discreet, thickness of a material that is compositionally unique as compared to any material(s) adjacent thereto (i.e., in contact therewith) and/or separately applied/formed, or can refer to, essentially, a series of sub-layers in successive contact with one another that, together, may provide a particular function. In the description that follows both usages of the term "layer" appear.

The Invention

In one aspect, the invention provides processes for producing in-mold labeled containers. The processes comprise setting a multilayered label comprising an oxygen absorbing resin layer onto an inner wall surface of a female mold part or an outer wall surface of a male mold part and then injecting a melted resin into a cavity between the male and female mold parts. These processes mold and label the container simultaneously and produce a container wherein the multilayered label covers all of an outer surface or an inner surface of the container. Thus, an in-mold labeled container is produced that limits the transmission of oxygen into the container and its contents even when stored over a relatively long term, e.g., 1 to 18 months.

In one embodiment, the process comprises setting a multilayered label comprising an oxygen barrier layer into a mold, and injecting a melted resin into the mold, thereby forming the container, the oxygen barrier layer comprising at least one oxygen absorbing resin layer containing ethylene/vinyl alcohol copolymer and an oxygen absorbent.

In preferred embodiments, the in-mold labeled containers produced are retortable containers.

In a preferred embodiment, the multilayered label is of sufficient size to cover, and is set into the mold to cover, all of the external surface of the container.

In a preferred embodiment, the multilayered label has at least a layered structure including a moisture resistant resin layer and an oxygen barrier layer, and an outermost layer of the multilayered label is the moisture resistant resin layer.

In a preferred embodiment, the multilayered label has at least a layered structure including the moisture resistant resin layer/the oxygen barrier layer/another moisture resistant resin layer.

In a preferred embodiment, the oxygen barrier layer has a layered structure including an oxygen barrier resin sublayer/the oxygen absorbing resin sublayer/another oxygen barrier resin sublayer.

In a preferred embodiment, the multilayered label has a thickness of from about 50 to about 300 μm.

In a preferred embodiment, the oxygen barrier layer has a thickness of from about 5 to about 100 μm.

In a preferred embodiment, total thickness of the outer layer of the barrier layer is from about 20 to about 150 μm.

In a preferred embodiment, the oxygen absorbing resin layer further contains a transition metal salt.

In a preferred embodiment, a humidity resistant resin layer is present that has a moisture permeability of about 40 g·30 μm/m$^2$ day or less at a temperature of about 40° C. and a relative humidity of about 90%.

In a preferred embodiment, the humidity resistant resin layer is made of a resin identical to the melted resin.

In a preferred embodiment, the humidity resistant resin layer is made of polypropylene or polyethylene terephthalate.

In a preferred embodiment, a ratio of X/Y where X represents a total thickness of the humidity resistant resin layer and one or more optional layers layered outside the oxygen barrier layer, and Y represents a thickness of the container, is from about 0.01 to about 0.25.

In a preferred embodiment, the in-mold labeled container is a retortable container, e.g., a retortable package.

Figure 2:
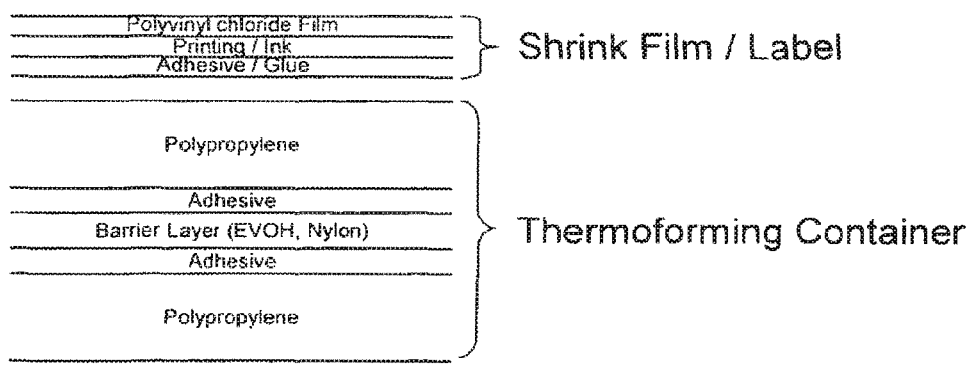
FIG. 2 illustrates a known shrink wrap label used on containers.
Figure 3:
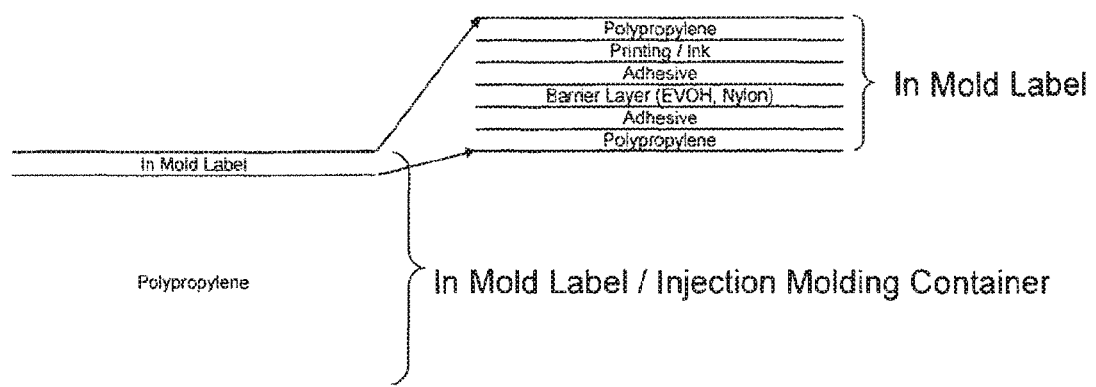
FIG. 3 illustrates a known in-mold label.

FIG. 2 and FIG. 3, when compared to FIG. 1, illustrate the differences between known labels and containers and the labels and containers of the invention. The label in FIG. 2 is typically used with non-retorted containers for products such as beverages. Container structures of this type are shown in FIG. 3. Generally, these labels do not completely encircle the container. Further, the IML with this construction does not have the strength to withstand retorting. In contrast, the container of the invention is retortable.

In one embodiment, the IML structure shown in FIG. 1 is pre-printed. Then, to produce a container of the invention, the pre-printed IML label is placed in a mold. The polypropylene body is then formed in the same mold in such a way that the container body is completely encircled (sides and bottom) by the IML which is fused onto it. A cross-sectional drawing showing the container and IML layers are seen in FIG. 1. The double layer of EVOH together with the container body construction imparts the strength required to withstand retorting. The oxygen scavenging layer and light barrier due to the inks in the IML allows the product to be stable to oxidation through its shelf-life. After the container with the IML is formed, it is then filled, sealed, and retorted as described herein. The difference is that the label is now part of the container; there are no issues with labels not staying in position on the container.

Thus, according to the invention, processes are provided for producing in-mold labeled containers having excellent oxygen barrier properties, preferably containers that can be retorted.

In another aspect, the invention provides in-mold labeled containers produced by processes of the invention.

In another aspect, the invention provides in-mold labeled containers. The containers comprise a multilayered label comprising an oxygen absorbing resin layer and a resin container body, wherein the multilayered label covers all of an outer surface or an inner surface of the container. In one embodiment, the in-mold labeled container further comprising one or more comestible or non-comestible compositions inside said container. In various embodiments, the comestible compositions are a human food compositions, pet food compositions, dog food compositions, fish food compositions, or cat food compositions. In preferred embodiments, the in-mold labeled container has been sealed and retorted. In various embodiments, the non-comestible compositions paint, fertilizer, animal litter, detergent, and the like.

In another aspect, the invention provides a product comprising a container of the invention and one or more materials contained in the container. In various embodiments, the material is comestible composition, e.g., a food such as a human or pet food. In other embodiments, the material is a liquid, e.g., a beverage such as an energy drink or milk replacer. In various embodiments, the material is a material that is retortable. The material is not limited so long as it is compatible with the container, e.g., the material could be paint, fertilizer, and the like.

In a further aspect, the invention provides processes for producing in-mold labeled containers. The processes comprises setting a multilayered label having an oxygen barrier layer into a mold and adjacent to the mold body, and injecting a melted resin into the mold leaving the label between the mold body and the melted resin, thereby forming the container. In a preferred embodiment, the oxygen barrier layer comprises at least an oxygen absorbing (scavenger) resin layer comprising an ethylene vinyl alcohol copolymer (EVOH) and/or other resin and an oxygen absorbent.

In the processes and containers of the invention, the ethylene content by percentage in the EVOH contained in the oxygen absorbing resin layer, and the saponification degree of the EVOH, is not particularly limited. The ethylene content by percentage in the EVOH contained in the oxygen absorbing resin layer is preferably from about 5 to about 60% by mole, more preferably from about 10 to about 55% by mole, and even more preferably from about 20 to about 50% by mole. The saponification degree of the EVOH contained in the oxygen absorbing resin layer is preferably about 90% or more, more preferably about 95% or more, and even more preferably about 98% or more.

Regarding the EVOH, only one species thereof may be used, or two or more species thereof that are different from each other for example in the content by percentage of ethylene may be used together in the same layer. When two or more EVOH species are used together, the average of the individual ethylene contents by percentage in the two or more species that is calculated out from the blend ratio by weight between the species is defined as the ethylene content by percentage of the used EVOH species. In this case, regarding the EVOH species that have the largest and smallest ethylene contents by percentage, respectively, it is preferred that the difference between the ethylene contents by percentage is about 30% or less by mole and the difference between the saponification degrees thereof is about 10% or less. The difference between the ethylene contents by percentage is more preferably about 20% or less by mole, and even more preferably about 15% or less by mole. The difference between the saponification degrees is more preferably about 7% or less, and even more preferably about 5% or less.

The content of ethylene by percentage in the EVOH, and the saponification degree thereof, may be obtained by nuclear magnetic resonance (NMR).

The oxygen absorbent contained in the oxygen absorbing resin layer is not particularly limited as long as the material is capable of absorbing oxygen. The oxygen absorbent contained in the oxygen absorbing resin layer may be, for example, an organic compound such as a compound having a carbon-carbon double bond, a polymer having a secondary or tertiary carbon atom, or a polyamide resin; or powder of reducible metal such as reducible iron or reducible zinc.

Examples of the compound having a carbon-carbon double bond include polybutadiene, polyisoprene, polychloroprene, poly(2-ethylbutadiene), poly(2-butylbutadiene) and any other polydiene that are each obtained by polymerization of monomer molecules mainly at the 1,4-positions thereof (such as 1,4-polybutadiene); ring-opened metathesis polymers of any cycloolefin (such as polyoctenylene, polypentenylene, and polynorbornene); and block copolymers each having a polydiene block, such as styrene-isoprene-styrene triblock copolymer. Of these examples, polybutadiene and polyoctenylene are preferred.

Regarding a compound having a carbon-carbon double bond, the wording "carbon-carbon double bond" does not include, in the category thereof, any carbon-carbon double bond contained in an aromatic ring.

The oxygen barrier layer may have a monolayer structure made only of the oxygen absorbing resin layer, or a multilayered structure including the oxygen absorbing resin layer as a sublayer. The oxygen barrier layer preferably has a layered structure containing a first oxygen barrier resin sublayer/the oxygen absorbing resin sublayer/a second oxygen barrier resin sublayer which may be the same or different from the first, arranged and in contact with one another as described in a "stack" or "sandwich" formation. See, for example, the oxygen barrier layer in FIG. 1 between adhesive layers (Barrier Layer/O$_2$Scavenger/Barrier Layer). Only one oxygen barrier resin sublayer may be used, or several, if desired. When more than one oxygen barrier resin sublayers are present, they may be identical to each other, as in FIG. 1, or may be different from each other. Generally, the oxygen absorbing resin is higher in cost than the oxygen barrier resin; thus, when oxygen barrier resin sublayers are laid on both sides of the oxygen absorbing resin sublayer, a container having an excellent oxygen barrier properties is obtained at low cost.

The oxygen barrier resin is not particularly limited, and examples thereof include EVOH, which has been described above, nylon, polyamide resin, polyester resin, polyvinyl chloride resin, and polyacrylonitrile resin, including blends thereof.

The thickness of the oxygen barrier layer is not particularly limited, and is preferably from about 5 to about 100 µm, and even more preferably from about 10 to about 60 µm.

Various additives may be added to the oxygen absorbing resin layer as long as the effect and advantageous properties of the invention are not overly compromised. Examples of such additives include resins other than EVOH (such as polyethylene, polypropylene, and polystyrene), a transition metal salt, a plasticizer, a thermal stabilizer (melt stabilizer), a photoinitiator, a deodorizer, an ultraviolet absorbent, an antistatic agent, a lubricant, a colorant, a filler, a drying agent, a bulking agent, a pigment, a dye, a processing aid, a flame retardant, and a antifogging agent. More than one additive can be utilized.

When the oxygen absorbent is in particular an organic compound, the incorporation of one or more transition metal salts into the layer makes it possible to improve the oxygen absorbing performance of the oxygen absorbing resin layer.

Examples of transition metal salts include iron salts, nickel salts, copper salts, manganese salts, cobalt salts, rhodium salts, titanium salts, chromium salts, vanadium salts, and ruthenium salts. However, the metal salt is not limited thereto. Of these salts, iron salts, nickel salts, copper salts, manganese salts, and cobalt salts are preferred, manganese salts and cobalt salts are more preferred, and cobalt salts are even more preferred.

In the transition metal salt, the counter ion of the transition metal is an anion originating from an organic acid or a chloride. Examples of the organic acid include acetic acid, stearic acid, acetylacetone, dimethyldithiocarbamic acid, palmitic acid, 2-ethylhexanoic acid, neodecanoic acid, linoleic acid, tall oil acid, oleic acid, capric acid, and naphthenic acid. Particularly preferred examples of the transition metal salt are cobalt 2-ethylhexanoate, cobalt neodecanoate, and cobalt stearate.

The amount of the transition metal salt incorporated into 100 parts by weight of the oxygen absorbing resin is preferably from about 0.001 to about 0.5 part by weight (10 to 5000 ppm), more preferably from about 0.01 to about 0.1 part by weight (100 to 1000 ppm), and even more preferably from about 0.02 to about 0.08 part by weight (200 to 800 ppm), the amount of the salt being a metal-converted amount.

The physical form that the oxygen absorbent and the EVOH take in the oxygen absorbing resin layer is not particularly limited, and is preferably, for example, the form where the oxygen absorbent is dispersed in the EVOH. The method for dispersing the oxygen absorbent into the EVOH may be, for example, a method of melting and kneading the oxygen absorbent and the EVOH to disperse particles of the oxygen absorbent into a matrix of the EVOH.

It is preferred that the multilayered label used in the processes of the invention have at least a layered structure having a moisture and humidity resistant resin layer (sometimes referred to simply as a humidity resistant resin layer or a moisture resistant resin layer) and the above-mentioned oxygen barrier layer (moisture resistant resin layer/oxygen barrier layer), and the outermost layer of the multilayered label is the moisture and humidity resistant resin layer. It is particularly preferred that the multilayered label used in the producing process of the invention has at least a layered structure having the moisture resistant resin layer/the oxygen barrier layer/another moisture resistant resin layer. In this case, the humidity resistant resin layers, between which the oxygen barrier layer is sandwiched, may be the same as each other, or different from each other.

The humidity resistant resin is not particularly limited as long as the resin is a resin having humidity resistance. Examples thereof include polypropylene, polyethylene, and polyethylene terephthalate. The resin is in particular preferably a humidity resistant resin having a moisture permeability of about 40 g 30 µm/m²·day or less at a temperature of about 40° C. and a relative humidity of about 90%, more preferably a humidity resistant resin having a moisture permeability of about 35 g·30 µm/m²·day or less at the same temperature and the same relative humidity, and even more preferably a humidity resistant resin having a moisture permeability of about 20 g' 30 µm/m² day or less at the same temperature and the same relative humidity. Such a humidity resistant resin is in particular preferably polypropylene or polyethylene terephthalate. Blends can be used.

In a preferred embodiment the humidity resistant resin layer is layered onto the oxygen barrier layer through an adhesive layer (humidity resistant resin layer/adhesive layer/oxygen barrier layer). The adhesive agent used in the adhesive layer may be an adhesive resin, such as maleic anhydride modified polyolefin.

The multilayered label can be obtained by a coextrusion method (such as coextrusion film molding, coextrusion sheet molding or coextrusion inflation molding) or a laminating method (such as extrusion lamination, sandwich lamination, coextrusion lamination, dry lamination, or solvent-free dry lamination), which is used when an ordinary packaging material is produced.

The melting temperature in the extrusion step when the multilayered label is produced may be appropriately set in accordance with the melting point of the used resin, and is usually from about 120 to about 330° C., preferably from about 150 to about 300° C.

The thickness of the multilayered label is not particularly limited, and is preferably from about 50 to about 300 µm, and more preferably from about 70 to about 200 µm. Furthermore, total thickness of the outer layer of the barrier layer is preferably from about 20 to about 150 µm, and more preferably between about 30 and about 120 µm.

An in-mold labeled (IML) container is a container obtained by molding of a container body and labeling onto the body simultaneously, and is yielded by the IML method. The IML method is a technique using a mold composed of a male mold part and a female mold part, setting a multilayered label onto one or more inner wall surfaces of the female mold part and/or outer wall surfaces of the male mold part in a cavity generated by fastening/inserting the male and female mold parts with each other, and then injecting a melted resin into the cavity, thereby molding a container body and labeling the body simultaneously.

It is possible that the invention multilayered label is set onto the inner wall surface(s) of the female mold part, the outer wall surface(s) of male mold part and both of them (using two multilayered labels). The multilayered label is preferably set onto the whole of the inner wall surface(s) of the female mold part, so that the label covers the whole of the outer surface(s) of the molded container. In the invention embodiment where the multilayered label does not cover the whole of the outer (and/or inner) surface(s) of the container, the uncovered region of the container may be lower in its oxygen barrier property; thus, the obtained container may not have as excellent an overall oxygen barrier property.

In the process of the invention where the multilayered label covers the whole of the outer surface(s) of the molded container, after the setting of the multilayered label into the mold (on the inner wall surface(s) of the female mold part in the cavity generated by fastening the male and female mold part with each other), a melted resin is injected into the mold, thereby molding a container. Specifically, the male mold part is pushed into the female mold part to which the multilayered label is set from the above, and then a melted resin is poured into the cavity between the male and female mold parts, leaving the label against the female mold surface, so as to mold an IML container where the multilayered label covers the whole of the outer surface(s) of the molded container.

The melted resin may be a resin used ordinarily as the material of IML containers. Examples thereof include polypropylene, polyethylene, polystyrene, and polyethylene terephthalate. The melted resin is preferably a resin identical to the humidity resistant resin. When a resin identical to the humidity resistant resin is used as the melted resin, the adhesiveness between the multilayered label and the container body becomes good so that an IML container excellent in external appearance is obtained.

The melting temperature of the resin to be melted may be appropriately set in accordance with the melting point of the used resin, and is usually from about 120 to about 330° C., preferably from about 150 to about 300° C.

Where the total thickness of one or more optional layers layered outside (i.e., away from the injected melted resin) the oxygen barrier layer of the label (e.g., the moisture and humidity resistant resin layer) is represented by X and the thickness of the container (i.e., the total thickness of the multilayered label and the container body) is represented by Y, the ratio of X/Y is preferably from about 0.01 to about 0.25, more preferably from about 0.02 to about 0.2, more preferably from about 0.04 to about 0.1, and even more preferably from about 0.06 to about 0.1. When food is filled into the IML container and then the container is retorted, the relative humidity of the oxygen barrier layer during storage of the IML container can be kept relatively low by setting the ratio of X/Y into the range of about 0.01 to about 0.25. The oxygen barrier property of the EVOH contained in the oxygen barrier layer depends on humidity. Thus, when the relative humidity is kept low, the IML container keeps an excellent oxygen barrier property.

Since the IML container obtained according to the invention exhibits excellent oxygen barrier properties, the container may be used as a food package containing a comestible composition. Examples of comestible compositions include a human food composition, a animal (such as a dog or a cat) food composition. The comestible composition can be of any form, including liquid and solid. In preferred embodiments, the containers can be sealed and retorted.

The container may also be used as package for retort-packing food or pet food since the container exhibits excellent oxygen barrier properties even after the container is retorted.

In another aspect, the invention provides processes preventing the degradation of products subject to degradation by oxygen and for extending the shelf-life of products subject to degradation by oxygen. The processes comprise setting a multilayered label comprising an oxygen absorbing resin layer onto an inner wall surface of a female mold part or an outer wall surface of a male mold part; injecting a melted resin into a cavity between the male and female mold parts, thereby simultaneously producing and labeling an in-mold labeled container; placing the product into the container; and sealing the container. Once sealed, the container limits the amount of oxygen that can enter the container.

The processes and containers of the invention limit amount of oxygen that enters into the container in a given period. Such limiting prevents oxygen from degrading the contents of the container and extends the shelf life of the product.

The invention is not limited to the particular methodology, protocols, and reagents described herein because they may vary. Further, the terminology used herein is for the purpose of describing particular embodiments only and is not intended to limit the scope of the present invention.

As used herein, ranges are used herein in shorthand, so as to avoid having to list and describe each and every value within the range. Any appropriate value within the range can be selected, where appropriate, as the upper value, lower value, or the terminus of the range.

Unless defined otherwise, all technical and scientific terms and any acronyms used herein have the same meanings as commonly understood by one of ordinary skill in the art in the field of the invention. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, are relevant prior art for the present invention and the right to challenge the accuracy and pertinence of such patents, patent applications, publications, and other references is specifically reserved.

EXAMPLES

The invention is further illustrated by the following examples, although it will be understood that the examples are included merely for purposes of illustration and are not intended to limit the scope of the invention unless otherwise specifically indicated.

Example 1

Preparation of Polyoctenylene

A three-necked flask equipped with a stirrer and a thermostat was purged with dry nitrogen. 624 parts by weight of heptane wherein 110 parts by weight of cis-cyclooctene and 0.187 part by weight of cis-4-octene were dissolved were put into the three-necked flask. Next, 0.0424 part by weight of [1,3-bis(2,4,6-trimethylphenyl)-2-imidazolidinylidene]dichloro(phenylmethylene)(tricyclohexylphosphine)ruthenium was dissolved into 3 parts by weight of toluene to prepare a catalytic liquid. This catalytic liquid was rapidly put into the three-necked flask, and the solution was stirred at 55° C. to conduct a ring-opening metathesis polymerization. After 1 hour, the reaction liquid was analyzed by means of a gas chromatograph (GC-14B, manufactured by Shimadzu Corp.; column: G-100 manufactured by Chemicals Evaluation and Research Institute, Japan). As a result, it was verified that cis-cyclooctene was lost. Next, 1.08 parts by weight of ethyl vinyl ether were put into the three-necked flask, and further the mixed liquid was stirred for 10 minutes.

200 parts by weight of water were added to the resultant reaction liquid, and the mixed liquid was stirred at 40° C. for 30 minutes. Next, the liquid was allowed to stand still at 40° C. for 1 hour so as to be separated into liquid phases. The water phase was then removed. 100 parts by weight of water were again added to the remaining liquid, and the mixed liquid was stirred at 45° C. for 30 minutes. Next, the liquid was allowed to stand still at 40° C. for 1 hour to be separated into liquid phases. The water phase was then removed. Next, heptane was distilled off from the remaining liquid under reduced pressure. A vacuum drier was used to dry the resultant solid at 1 Pa and 100° C. for 6 hours, so as to yield 102.1 parts by weight of a polymer having a weight-average molecular weight (MW) of 14200 wherein the proportion of oligomers each having a molecular weight of 1000 or less was 9.2% (yield: 92%). In this polymer (polyoctenylene), the ratio of carbon-carbon double bonds in its side chains to all of its carbon-carbon double bonds was 0%.

The resultant polymer was crushed into pieces of 1 mm square, and the pieces were put into a separable flask equipped with a stirrer, a reflux condenser tube and a thermostat. Next, 300 parts by weight of acetone were put into the separable flask, and the mixture was stirred at 40° C. for 3 hours. Acetone was then removed by decantation. 300 parts by weight of acetone were again put into the separable flask, and the mixture was stirred at 40° C. for 3 hours. Acetone was then removed by decantation. The remaining fragment of acetone was distilled off under reduced pressure. A vacuum drier was used to dry the resultant solid at 1 Pa and 100° C. for 6 hours, so as to yield 99 parts by weight of polyoctenylene having a weight-average molecular weight (Mw) of 150000 and a number-average molecular weight of 37000 wherein the proportion of oligomers each having a molecular weight of 1000 or less was 3.1%.

Example 2

Preparation of Styrene-Isoprene-Styrene Triblock Copolymer 600 parts by volume of cyclohexane, 0.16 part by volume of N,N,N',N'-tetramethylethylenediamine (TMEDA) and 0.094 part by volume of n-butyllithium as an initiator were charged into a stirring type autoclave clarified with dry nitrogen. The temperature was raised to 50° C., and then 4.25 parts by volume of a styrene monomer were fed thereinto so as to conduct polymerization for 1.5 hours. Next, the temperature was lowered to 30° C., and then 120 parts by volume of isoprene were fed thereinto so as to conduct polymerization for 2.5 hours. Furthermore, the temperature was again raised to 50° C., and then 4.25 parts by volume of a styrene monomer were fed thereinto so as to conduct polymerization for 1.5 hours.

To the resultant reaction liquid were added 2-tert-butyl-6-(3-tert-butyl-2-hydroxy-5-methylbenzyl)-4-methylphenyl acrylate, and pentaerythritol tetrakis(3-laurylthiopropionate) as antioxidants, the amount of each of which was 0.15 part by weight for 100 parts by weight of the used styrene and isoprene. The reaction liquid was poured into methanol to precipitate a product. This was separated and dried to yield a styrene/isoprene/styrene triblock copolymer to which the antioxidants were added.

The number-average molecular weight of the resultant triblock copolymer was 85000, and the molecular weight of the styrene blocks in the copolymer was 8500. The styrene content by percentage therein was 14% by mole, and the ratio of carbon-carbon double bonds in its side chains to all of its carbon-carbon double bonds was 55%. The content of the carbon-carbon double bonds in the resultant triblock copolymer was 0.014 eq/g. The melt flow rate was 7.7 g/10 minutes. The resin contained 0.12% by weight of 2-tert-butyl-6-(3-tert-butyl-2-hydroxy-5-methylbenzyl)-4-methyl-phenyl acrylate, and 0.12% by weight of pentaerythritol tetrakis(3-laurylthiopropionate).

Example 3

Preparation of Label 96 parts by weight of EVOH having an ethylene content by percentage of 27% by mole, a saponification degree of 99.8%, and a MFR of 4.0 g/10 minutes (at 210° C. under a load of 2160 g) as EVOH (a-1), 4 parts by weight of the polyoctenylene yielded in Example 1, and 0.2121 part by weight of cobalt (II) stearate (the metallic-cobalt-converted amount: 200 ppm) were charged into a twin-screw extruder (LABO PLASTOMIL MODEL 15C300, manufactured by Toyo Positive electrode Seisaku-Sho, Ltd.) having a diameter of 25 min. The components were extruded at 210° C. under the screw rotation number of 100 rpm and at the extruded-resin amount of 4 kg/hour to yield oxygen absorbing resin composition pellets.

Next, the resultant oxygen absorbing resin composition pellets, polypropylene (PP) (NOVATEC EA7A, manufactured by Japan Polypropylene Corp.), and an adhesive resin (AD) (Admer QF500, manufactured by Mitsui Chemicals, Inc.) were separately melted and kneaded in individual extruders, and an coextruder was used to prepare, at an extruding temperature of 220° C., a multilayered label composed of 5 layers classified into 3 kinds (PP layer/AD layer/oxygen barrier layer (oxygen absorbing resin layer)/AD layer/PP layer, the thicknesses of which were 40 μm, 10 μm, 20 μm, 10 μm, and 40 μm, respectively).

Molding of an IML Container

The resultant multilayered label was cut in accordance with the shape of the inner wall surfaces of a female mold part of a container-forming mold. The cut multilayered label was set onto the inner wall surfaces of the female mold part of the mold. Next, a male mold part was pushed into the female mold part from the above, and then a melted resin (polypropylene (NOVATEC EA7A)) was injected into the cavity between the male and female mold parts at 220° C. In this way, the injection molding was performed to mold an IML container. The thickness of the body of the container was 700 μm, and the surface area was 83 cm². The whole of the outside of the container was covered with the label. The ratio of X/Y was 0.061 where X represents the total thickness (50 μm) of the layers (the propylene layer/the adhesive layer) outside the oxygen barrier layer of the multilayered label, and Y represents the thickness (820 μm) of the container.

Measurement of the Cumulative Oxygen Transmission Amount

Regarding the resultant IML container, the cumulative transmission amount of oxygen into the container was measured as follows: The IML container was subjected to retort treatment at 121° C. for 25 minutes, and then a change in the oxygen permeability of the container was measured with time under conditions that the temperature was 20° C., the relative humidity of the outside was 65% and that of the inside was 100%. From the resultant change in the oxygen permeability with time, the cumulative oxygen transmission amount was calculated when the container was stored in the air for 18 months. The result is shown in Table 1.

Example 4

The oxygen absorbing resin composition pellets obtained in Example 3, EVOH (a-1), polypropylene (PP) (NOVATEC EA7A, manufactured by Japan Polypropylene Corp.), and an adhesive resin (AD) (Admer QF500, manufactured by Mitsui Chemicals, Inc.) were separately melted and kneaded in individual extruders, and an coextruder was used to prepare, at an extruding temperature of 220° C., a multilayered label composed of 7 layers classified into 4 kinds (PP layer/AD layer/EVOH layer/oxygen absorbing resin layer/EVOH layer/AD layer/PP layer, the thicknesses of which were 40 μm, 10 μm, 10 μm, 10 μm, 10 μm, 10 μm, and 40 μm, respectively). Example 3 was repeated except that the thus-prepared multilayered label was used, an IML container was molded and the cumulative oxygen transmission amount thereof was obtained. The result is shown in Table 1.

Example 5

Example 3 was repeated except that the thickness of the oxygen barrier layer (oxygen absorbing resin layer) was set to 30 μm, an IML container was molded and the cumulative oxygen transmission amount thereof was obtained. The result is shown in Table 1.

Example 6

Example 5 was repeated except that the following were used in the preparation of the oxygen absorbing resin composition, an IML container was molded and the cumulative oxygen transmission amount thereof was obtained: 92 parts by weight of EVOH (a-1); 8 parts by weight of a polybutadiene (polybutadiene rubber (Nipol BR 1220) manufactured by Nippon Zeon Co., Ltd.); and 0.2121 part by weight (cobalt-metal-converted amount: 200 ppm) of cobalt (II) stearate. The result is shown in Table 1.

Example 7

Example 5 was repeated except that the following were used in the preparation of the oxygen absorbing resin composition, an IML container was molded and the cumulative oxygen transmission amount thereof was obtained: 92 parts by weight of EVOH (a-1); 8 parts by weight of the styrene-isoprene-styrene triblock copolymer yielded in Example 2; and 0.2121 part by weight (cobalt-metal-converted amount: 200 ppm) of cobalt (II) stearate. The result is shown in Table 1.

Example 8

Example 3 was repeated except that the thickness of the oxygen barrier layer (oxygen absorbing resin layer) was set to 25 μm and the thickness of the container body was set to 900 μm, an IML container was molded and the cumulative oxygen transmission amount thereof was obtained. The result is shown in Table 1.

Example 9

Example 8 was repeated except that the thickness of the oxygen barrier layer (oxygen absorbing resin layer) was set to 40 μm, an IML container was molded and the cumulative oxygen transmission amount thereof was obtained. The result is shown in Table 1.

Example 10

Example 8 was repeated except that the thickness of the oxygen barrier layer (oxygen absorbing resin layer) was set to 50 μm, an IML container was molded and the cumulative oxygen transmission amount thereof was obtained. The result is shown in Table 1.

Example 11

Example 10 was repeated except that the following were used in the preparation of the oxygen absorbing resin composition, an IML container was molded and the cumulative oxygen transmission amount thereof was obtained: 92 parts by weight of EVOH (a-1); 8 parts by weight of a polybutadiene (polybutadiene rubber (Nipol BR 1220) manufactured by Nippon Zeon Co., Ltd.); and 0.2121 part by weight (cobalt-metal-converted amount: 200 ppm) of cobalt (II) stearate. The result is shown in Table 1.

Example 12

Example 10 was repeated except that the following were used in the preparation of the oxygen absorbing resin composition, an IML container was molded and the cumulative oxygen transmission amount thereof was obtained: 92 parts by weight of EVOH (a-1); 8 parts by weight of the styrene-isoprene-styrene triblock copolymer yielded in Example 2; and 0.2121 part by weight (cobalt-metal-converted amount: 200 ppm) of cobalt (II) stearate. The result is shown in Table 1.

Example 13

Example 8 was repeated except that in the preparation of the multilayered label the thicknesses of the polypropylene layer and the adhesive layer that were the outer layer of the label were set to 80 μm and 20 μm, respectively, the thicknesses of the adhesive layer and the polypropylene layer that were the inner layer of the label were set to 20 μm and 80 μm, respectively, and the thickness of the container body was set to 800 an IML container was molded and the cumulative oxygen transmission amount thereof was obtained. The result is shown in Table 1.

Example 14

Example 13 was repeated except that the thickness of the oxygen barrier layer (oxygen absorbing resin layer) was set to 40 μm, an IML container was molded and the cumulative oxygen transmission amount thereof was obtained. The result is shown in Table 1.

Example 15

Example 13 was repeated except that the thickness of the oxygen barrier layer (oxygen absorbing resin layer) was set to 50 μm, an IML container was molded and the cumulative oxygen transmission amount thereof was obtained. The result is shown in Table 1.

Example 16

Example 15 was repeated except that the following were used in the preparation of the oxygen absorbing resin composition, an IML container was molded and the cumulative oxygen transmission amount thereof was obtained: 92 parts by weight of EVOH (a-1); 8 parts by weight of a polybutadiene (polybutadiene rubber (Nipol BR 1220) manufactured by Nippon Zeon Co., Ltd.); and 0.2121 part by weight (cobalt-metal-converted amount: 200 ppm) of cobalt (II) stearate. The result is shown in Table 1.

Example 17

Example 15 was repeated except that the following were used in the preparation of the oxygen absorbing resin composition, an IML container was molded and the cumulative oxygen transmission amount thereof was obtained: 92 parts by weight of EVOH (a-1); 8 parts by weight of the styrene/isoprene/styrene triblock copolymer yielded in Example 2; and 0.2121 part by weight (cobalt-metal-converted amount: 200 ppm) of cobalt (II) stearate. The result is shown in Table 1.

Example 18

Example 3 was repeated except that an oxygen barrier resin layer (EVOH (a-1)) was used instead of the oxygen absorbing resin layer, an IML container was molded and the cumulative oxygen transmission amount thereof was obtained. The result is shown in Table 2.

Example 19

Example 18 was repeated except that the thickness of the oxygen barrier resin layer (EVOH (a-1)) was set to 30 μm, an IML container was molded and the cumulative oxygen transmission amount thereof was obtained. The result is shown in Table 2.

Example 20

Example 18 was repeated except that the thickness of the oxygen barrier resin layer (EVOH (a-1)) was set to 25 μm and the thickness of the container body was set to 900 μm, an IML container was molded and the cumulative oxygen transmission amount thereof was obtained. The result is shown in Table 2.

Example 21

Example 20 was repeated except that the thickness of the oxygen barrier resin layer (EVOH (a-1)) was set to 40 μm, an IML container was molded and the cumulative oxygen transmission amount thereof was obtained. The result is shown in Table 2.

Example 22

Example 20 was repeated except that the thickness of the oxygen barrier resin layer (EVOH (a-1)) was set to 50 μm, an IML container was molded and the cumulative oxygen transmission amount thereof was obtained. The result is shown in Table 2.

Example 23

Example 20 was repeated except that in the preparation of the multilayered label the thicknesses of the polypropylene layer and the adhesive layer that were the outer layer of the label were set to 80 μm and 20 respectively, the thicknesses of the adhesive layer and the polypropylene layer that were the inner layer of the label were set to 20 μm and 80 respectively, and the thickness of the container body was set to 800 μm, an IML container was molded and the cumulative oxygen transmission amount thereof was obtained. The result is shown in Table 2.

Example 24

Example 23 as repeated except that the thickness of the oxygen barrier resin layer (EVOH (a-1)) was set to 40 μm, an IML container was molded and the cumulative oxygen transmission amount thereof was obtained. The result is shown in Table 2.

Example 25

Example 23 was repeated except that the thickness of the oxygen barrier resin layer (EVOH (a-1)) was set to 50 μm, an IML container was molded and the cumulative oxygen transmission amount thereof was obtained. The result is shown in Table 2.

Example 26

The oxygen absorbing resin composition pellets obtained in Example 3, EVOH (a-1), polyethylene terephthalate (PET) (PET 9921, manufactured by Eastman Chemical Co.), and an adhesive resin (AD) (Admer SF731, manufactured by Mitsui Chemicals, Inc.) were separately melted and kneaded in individual extruders, and an coextruder was used to prepare, at an extruding temperature of 270° C., a multilayered label composed of 5 layers classified into 3 kinds (PET layer/AD layer/oxygen barrier layer (oxygen absorbing resin layer)/AD layer/PP layer, the thicknesses of which were 40 μm, 10 μm, 50 μm, 10 μm, and 40 μm, respectively).

Example 3 was repeated except that the temperature for the injection molding was set to 290° C. and the thickness of the container body was set to 900 μm, the resultant multilayered label was used and polyethylene terephthalate (PET 9921, manufactured by Eastman Chemical Co.) was used as a melted resin to mold an IML container, and then the cumulative oxygen transmission amount thereof was obtained. The result is shown in Table 3.

Example 27

Example 26 was repeated except that the following were used in the preparation of the oxygen absorbing resin composition, an IML container was molded and the cumulative oxygen transmission amount thereof was obtained: 92 parts by weight of EVOH (a-1); 8 parts by weight of a polybutadiene (polybutadiene rubber (Nipol BR 1220) manufactured by Nippon Zeon Co., Ltd.); and 0.2121 part by weight (cobalt-metal-converted amount: 200 ppm) of cobalt (II) stearate. The result is shown in Table 3.

Example 28

Example 26 was repeated except that the following were used in the preparation of the oxygen absorbing resin composition, an IML container was molded and the cumulative oxygen transmission amount thereof was obtained: 92 parts by weight of EVOH (a-1); 8 parts by weight of the styrene/isoprene/styrene triblock copolymer yielded in Example 2; and 0.2121 part by weight (cobalt-metal-converted amount: 200 ppm) of cobalt (II) stearate. The result is shown in Table 3.

Example 29

Example 26 was repeated except that an oxygen barrier resin layer (EVOH (a-1)) was used instead of the oxygen absorbing resin layer in the oxygen barrier layer, an IML container was molded and the cumulative oxygen transmission amount thereof was obtained. The result is shown in Table 3.

Example 30

Example 10 was repeated except that in the measurement condition the relative humidity of outside was 80%, an IML container was molded and the cumulative oxygen transmission amount thereof was obtained. The result is shown in Table 4.

Example 31

Example 30 was repeated expect that in the preparation of the multilayered label the thickness of the polypropylene layer and the adhesive layer that were the outer layer of the label were set to 5 μm and 5 μm, respectively, the thickness of the adhesive layer and the polypropylene layer that were the inner layer of the label were set to 5 μm and 5 μm, respectively, and the thickness of the container body was set to 980 μm, an IML container was molded and the cumulative oxygen transmission amount thereof was obtained. The result is shown in Table 4.

Example 32

Example 30 was repeated expect that in the preparation of the multilayered label the thickness of the polypropylene layer and the adhesive layer that were the outer layer of the label were set to 60 μm and 20 μm, respectively, the thickness of the adhesive layer and the polypropylene layer that were the inner layer of the label were set to 20 μm and 60 μm, respectively, and the thickness of the container body was set to 840 μm, an IML container was molded and the cumulative oxygen transmission amount thereof was obtained. The result is shown in Table 4.

Example 33

Example 30 was repeated expect that in the preparation of the multilayered label the thickness of the polypropylene layer and the adhesive layer that were the outer layer of the label were set to 80 μm and 20 μm, respectively, the thickness of the adhesive layer and the polypropylene layer that were the inner layer of the label were set to 20 μm and 80 μm, respectively, and the thickness of the container body was set to 800 μm, an IML container was molded and the cumulative oxygen transmission amount thereof was obtained. The result is shown in Table 4.

Example 34

Example 30 was repeated expect that in the preparation of the multilayered label the thickness of the polypropylene layer and the adhesive layer that were the outer layer of the label were set to 250 μm and 50 μm, respectively, the thickness of the adhesive layer and the polypropylene layer that were the inner layer of the label were set to 20 μm and 80 μm, respectively, and the thickness of the container body was set to 600 μm, an IML container was molded and the cumulative oxygen transmission amount thereof was obtained. The result is shown in Table 4.

Example 35

Example 30 was repeated except that an oxygen barrier layer (EVOH (a-1)) was used instead of the oxygen absorbing resin layer, an IML container was molded and the cumulative oxygen transmission amount thereof was obtained. The result is shown in Table 5.

Example 36

Example 35 was repeated expect that in the preparation of the multilayered label the thickness of the polypropylene layer and the adhesive layer that were the outer layer of the label were set to 5 μm and 5 μm, respectively, the thickness of the adhesive layer and the polypropylene layer that were the inner layer of the label were set to 5 μm and 5 μm, respectively, and the thickness of the container body was set to 980 μm, an IML container was molded and the cumulative oxygen transmission amount thereof was obtained. The result is shown in Table 5.

Example 37

Example 35 was repeated expect that in the preparation of the multilayered label the thickness of the polypropylene layer and the adhesive layer that were the outer layer of the label were set to 80 μm and 20 μm, respectively, the thickness of the adhesive layer and the polypropylene layer that were the inner layer of the label were set to 20 μm and 80 μm, respectively, and the thickness of the container body was set to 800 μm, an IML container was molded and the cumulative oxygen transmission amount thereof was obtained. The result is shown in Table 5.

Example 38

Example 30 was repeated expect that in the preparation of the multilayered label the thickness of the polypropylene layer and the adhesive layer that were the outer layer of the label were set to 250 μm and 50 μm, respectively, the thickness of the adhesive layer and the polypropylene layer that were the inner layer of the label were set to 20 μm and 80 μm, respectively, and the thickness of the container body was set to 600 μm, an IML container was molded and the cumulative oxygen transmission amount thereof was obtained. The result is shown in Table 5.

It is understood that regarding the IML containers each obtained by the process of the invention, e.g., Examples 1 through 17, Example 26 through 28 and Example 30 through 34, wherein an oxygen barrier layer contains an oxygen absorbing resin layer, the cumulative oxygen transmission amount is smaller than that of the IML containers wherein the thickness of the container body and the thickness of the multilayered label are equal to those in the corresponding examples and further no oxygen absorbing resin layer is contained, e.g., Examples 18 through 25, Example 29 and Example 35 through 38.

As used herein, ranges are used herein in shorthand, so as to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a supplement", "a method", or "a food" includes a plurality of such "supplements", "methods", or "foods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims, the invention may be practiced otherwise than as specifically described.

TABLE 1

| | | Multilayered label | | | | | | | | | | |
|---|---|---|---|---|---|---|---|---|---|---|---|---|
| | | Layer structure (outer layer/oxygen barrier layer(s)/inner layer) | | | | Composition of (2) | | | | | | Cumulative |
| | | Outer layer | Oxygen barrier layer(s) | | | Inner | EVOH | Oxygen absorbent | Co | Container body | Container thickness | oxygen transmission |
| | | (μm) X | (1) (μm) | (2) (μm) | (1) (μm) | layer (μm) | (% by weight) | (% by weight) | concentration (ppm) | thickness (μm) | (μm) Y | X/Y | amount (cc/pkg-air) |
| Example. | 3 | 40/10 | — | 20 | — | 10/40 | EVOH(a-1) (96) | PCOE (4) | 200 | 700 | 820 | 0.061 | 8.1 |
| | 4 | 40/10 | 10 | 10 | 10 | 10/40 | EVOH(a-1) (96) | PCOE (4) | 200 | 700 | 830 | 0.060 | 1.9 |
| | 5 | 40/10 | — | 30 | — | 10/40 | EVOH(a-1) (96) | PCOE (4) | 200 | 700 | 830 | 0.060 | 1.4 |
| | 6 | 40/10 | — | 30 | — | 10/40 | EVOH(a-1) (92) | PBd (8) | 200 | 700 | 830 | 0.060 | 2.5 |
| | 7 | 40/10 | — | 30 | — | 10/40 | EVOH(a-1) (92) | SIS (8) | 200 | 700 | 830 | 0.060 | 2.8 |
| | 8 | 40/10 | — | 25 | — | 10/40 | EVOH(a-1) (96) | PCOE (4) | 200 | 900 | 1025 | 0.049 | 3.3 |
| | 9 | 40/10 | — | 40 | — | 10/40 | EVOH(a-1) (96) | PCOE (4) | 200 | 900 | 1040 | 0.048 | 0 |
| | 10 | 40/10 | — | 50 | — | 10/40 | EVOH(a-1) (96) | PCOE (4) | 200 | 900 | 1050 | 0.048 | 0 |
| | 11 | 40/10 | — | 50 | — | 10/40 | EVOH(a-1) (92) | PBd (8) | 200 | 900 | 1050 | 0.048 | 0.7 |
| | 12 | 40/10 | — | 50 | — | 10/40 | EVOH(a-1) (92) | SIS (8) | 200 | 900 | 1050 | 0.048 | 0.9 |
| | 13 | 80/20 | — | 25 | — | 20/80 | EVOH(a-1) (96) | PCOE (4) | 200 | 800 | 1025 | 0.098 | 0.4 |
| | 14 | 80/20 | — | 40 | — | 20/80 | EVOH(a-1) (96) | PCOE (4) | 200 | 800 | 1040 | 0.096 | 0 |
| | 15 | 80/20 | — | 50 | — | 20/80 | EVOH(a-1) (96) | PCOE (4) | 200 | 800 | 1050 | 0.095 | 0 |
| | 16 | 80/20 | — | 50 | — | 20/80 | EVOH(a-1) (92) | PBd (8) | 200 | 800 | 1050 | 0.095 | 0.2 |
| | 17 | 80/20 | — | 50 | — | 20/80 | EVOH(a-1) (92) | SIS (8) | 200 | 800 | 1050 | 0.095 | 0.3 |

Outer layer (humidity resistant resin): bilayered structure of polypropylene layer/adhesive layer
Inner layer (humidity resistant resin): bilayered structure of adhesive layer/polypropylene layer
(1): oxygen barrier resin layer
(2): oxygen absorbing resin layer
Co concentration: concentration (cobalt-metal converted concentration) in oxygen absorbing layer
PCOE: polyoctenylene PBd: polybutadiene SIS: styrene-isoprene-styrene triblock copolymer
The raw material of each of the containers was polypropylene, and the surface area thereof was 83 cm$^2$.

TABLE 2

| | | Multilayered label | | | | | | | | | | |
|---|---|---|---|---|---|---|---|---|---|---|---|---|
| | | Layer structure (outer layer/oxygen barrier layer(s)/inner layer) | | | | Composition of (2) | | | | | | Cumulative |
| | | Outer layer | Oxygen barrier layer(s) | | | Inner | EVOH | Oxygen absorbent | Co | Container body | Container thickness | oxygen transmission |
| | | (μm) X | (1) (μm) | (2) (μm) | (1) (μm) | layer (μm) | (% by weight) | (% by weight) | concentration (ppm) | thickness (μm) | (μm) Y | X/Y | amount (cc/pkg-air) |
| Example | 18 | 40/10 | 20 | — | — | 10/40 | — | — | — | 700 | 820 | 0.061 | 9.8 |
| | 19 | 40/10 | 30 | — | — | 10/40 | — | — | — | 700 | 830 | 0.060 | 4.1 |
| | 20 | 40/10 | 25 | — | — | 10/40 | — | — | — | 900 | 1025 | 0.049 | 5.5 |
| | 21 | 40/10 | 40 | — | — | 10/40 | — | — | — | 900 | 1040 | 0.048 | 2.1 |
| | 22 | 40/10 | 50 | — | — | 10/40 | — | — | — | 900 | 1050 | 0.048 | 1.4 |
| | 23 | 80/20 | 25 | — | — | 20/80 | — | — | — | 800 | 1025 | 0.098 | 2.8 |
| | 24 | 80/20 | 40 | — | — | 20/80 | — | — | — | 800 | 1040 | 0.096 | 1.2 |
| | 25 | 80/20 | 50 | — | — | 20/80 | — | — | — | 800 | 1050 | 0.095 | 0.8 |

Outer layer (humidity resistant resin): bilayered structure of polypropylene layer/adhesive layer
Inner layer (humidity resistant resin): bilayered structure of adhesive layer/polypropylene layer
(1): oxygen barrier resin layer
(2): oxygen absorbing resin layer
Co concentration: concentration (cobalt-metal converted concentration) in oxygen absorbing layer
The raw material of each of the containers was polypropylene, and the surface area thereof was 83 cm$^2$.

TABLE 3

| | | Multilayered label | | | | | | | | | | |
|---|---|---|---|---|---|---|---|---|---|---|---|---|
| | | Layer structure (outer layer/oxygen barrier layer(s)/inner layer) | | | | Composition of (2) | | | Container body | Container thickness | | Cumulative oxygen transmission |
| | | Outer layer | Oxygen barrier layer(s) | | Inner | EVOH | Oxygen absorbent | Co | | | | |
| | | (μm) X | (1) (μm) | (2) (μm) | (1) (μm) | layer (μm) | (% by weight) | (% by weight) | concentration (ppm) | thickness (μm) | (μm) Y | X/Y | amount (cc/pkg-air) |
| Example | 26 | 40/10 | — | 50 | — | 10/40 | EVOH (a-1) (96) | PCOE (4) | 200 | 900 | 1050 | 0.048 | 0 |
| | 27 | 40/10 | — | 50 | — | 10/40 | EVOH (a-1) (92) | PBd (8) | 200 | 900 | 1050 | 0.048 | 0.1 |
| | 28 | 40/10 | — | 50 | — | 10/40 | EVOH (a-1) (92) | SIS (8) | 200 | 900 | 1050 | 0.048 | 0.2 |
| | 29 | 40/10 | 50 | — | — | 10/40 | — | — | — | 900 | 1050 | 0.048 | 0.4 |

Outer layer (humidity resistant resin): bilayered structure of polyethylene terephthalate layer/adhesive layer
Inner layer (humidity resistant resin): bilayered structure of adhesive layer/polyethylene terephthalate layer
(1): oxygen barrier resin layer
(2): oxygen absorbing resin layer
Co concentration: concentration (cobalt-metal converted concentration) in oxygen absorbing layer
PCOE: polyoctenylene PBd: polybutadiene SIS: styrene-isoprene-styrene triblock copolymer
The raw material of each of the containers was polypropylene, and the surface area thereof was 83 $cm^2$.

TABLE 4

| | | Multilayered label | | | | | | | | | | |
|---|---|---|---|---|---|---|---|---|---|---|---|---|
| | | Layer structure (outer layer/oxygen barrier layer(s)/inner layer) | | | | Composition of (2) | | | Container body | Container thickness | | Cumulative oxygen transmission |
| | | Outer layer | Oxygen barrier layer(s) | | Inner | EVOH | Oxygen absorbent | Co | | | | |
| | | (μm) X | (1) (μm) | (2) (μm) | (1) (μm) | layer (μm) | (% by weight) | (% by weight) | concentration (ppm) | thickness (μm) | (μm) Y | X/Y | amount (cc/pkg-air) |
| Example | 30 | 40/10 | — | 50 | — | 10/40 | EVOH (a-1) (96) | PCOE (4) | 200 | 900 | 1050 | 0.048 | 0.05 |
| | 31 | 5/5 | — | 50 | — | 5/5 | EVOH (a-1) (96) | PCOE (4) | 200 | 980 | 1050 | 0.0095 | 7.10 |
| | 32 | 60/20 | — | 50 | — | 20/60 | EVOH (a-1) (96) | PCOE (4) | 200 | 840 | 1050 | 0.076 | 0 |
| | 33 | 80/20 | — | 50 | — | 20/80 | EVOH (a-1) (96) | PCOE (4) | 200 | 800 | 1050 | 0.095 | 0 |
| | 34 | 250/50 | — | 50 | — | 20/80 | EVOH (a-1) (96) | PCOE (4) | 200 | 600 | 1050 | 0.286 | 0.07 |

Outer layer (humidity resistant resin): bilayered structure of polypropylene layer/adhesive layer
Inner layer (humidity resistant resin): bilayered structure of adhesive layer/polypropylene layer
(1): oxygen barrier resin layer
(2): oxygen absorbing resin layer
Co concentration: concentration (cobalt-metal converted concentration) in oxygen absorbing layer
PCOE: polyoctenylene
The raw material of each of the containers was polypropylene, and the surface area thereof was 83 $cm^2$.

TABLE 5

| | | Multilayered label | | | | | | | | | | |
|---|---|---|---|---|---|---|---|---|---|---|---|---|
| | | Layer structure (outer layer/oxygen barrier layer(s)/inner layer) | | | | Composition of (2) | | | Container body | Container thickness | | Cumulative oxygen transmission |
| | | Outer layer | Oxygen barrier layer(s) | | Inner | EVOH | Oxygen absorbent | Co | | | | |
| | | (μm) X | (1) (μm) | (2) (μm) | (1) (μm) | layer (μm) | (% by weight) | (% by weight) | concentration (ppm) | thickness (μm) | (μm) Y | X/Y | amount (cc/pkg-air) |
| Example | 35 | 40/10 | 50 | — | — | 10/40 | — | — | — | 900 | 1050 | 0.048 | 1.80 |
| | 36 | 5/5 | 50 | — | — | 5/5 | — | — | — | 980 | 1050 | 0.0095 | 8.80 |

TABLE 5-continued

| | Multilayered label | | | | | | | | | | | |
|---|---|---|---|---|---|---|---|---|---|---|---|---|
| | Layer structure (outer layer/oxygen barrier layer(s)/inner layer) | | | | | Composition of (2) | | | | | | Cumulative |
| | Outer layer | Oxygen barrier layer(s) | | | Inner | EVOH | Oxygen absorbent | Co | Container body | Container thickness | | oxygen transmission |
| | (μm) X | (1) (μm) | (2) (μm) | (1) (μm) | layer (μm) | (% by weight) | (% by weight) | concentration (ppm) | thickness (μm) | (μm) Y | X/Y | amount (cc/pkg-air) |
| 37 | 80/20 | 50 | — | — | 20/80 | — | — | — | 800 | 1050 | 0.095 | 0.94 |
| 38 | 250/50 | 50 | — | — | 20/80 | — | — | — | 600 | 1050 | 0.286 | 0.52 |

Outer layer (humidity resistant resin): bilayered structure of polypropylene layer/adhesive layer
Inner layer (humidity resistant resin): bilayered structure of adhesive layer/polypropylene layer
(1): oxygen barrier resin layer
(2): oxygen absorbing resin layer
Co concentration: concentration (cobalt-metal converted concentration) in oxygen absorbing layer
The raw material of each of the containers was polypropylene, and the surface area thereof was 83 cm$^2$.

What is claimed is:

1. A process for producing an in-mold labeled container, the process comprising:
    setting a multilayered label comprising an oxygen absorbing resin layer onto an inner wall surface of a female mold part, the oxygen absorbing resin layer is a sublayer in a multilayered oxygen barrier layer, the multilayered oxygen barrier layer further comprising at least one oxygen barrier resin sublayer, the multilayered label further comprising at least one moisture resistant resin layer as the outermost layer or both the outermost and innermost layers of the multilayered label, the total thickness of one or more layers layered outside the multilayered oxygen barrier layer is represented by X and the total thickness of the container is represented by Y, the ratio of X/Y is from 0.06 to 0.1; and
    injecting a melted resin that is polypropylene into a cavity between the female mold part and a male mold part, thereby molding and labeling the container simultaneously.

2. The process of claim 1 wherein the multilayered label covers all of an outer surface of the container.

3. The process of claim 1 comprising setting a multilayered sheet comprising an additional oxygen absorbing resin layer onto an outer wall surface of the male mold part before the injecting of the melted resin into the cavity, wherein the multilayered label covers all of the outer surface of the container, and the multilayered sheet covers all of the inner surface of the container.

4. The process of claim 1 wherein the oxygen absorbing resin layer comprises an ethylene-vinyl alcohol copolymer (EVOH) and an oxygen absorbent.

5. The process of claim 4 wherein the ethylene content by percentage in the EVOH contained in the oxygen absorbing resin layer is from about 5 to about 60%.

6. The process of claim 4 wherein the saponification degree of the EVOH contained in the oxygen absorbing resin layer is about 90% or more.

7. The process of claim 4 wherein the oxygen absorbent is an organic compound, a polymer having a secondary or tertiary carbon atom, a polyamide resin, or a powder of reducible metal.

8. The process of claim 4 wherein the oxygen absorbent is an organic compound.

9. The process of claim 8 wherein the organic compound has a double bond.

10. The process of claim 9 wherein the compound having a carbon-carbon double bond is selected from the group consisting of polybutadiene, polyisoprene, polychloroprene, poly(2-ethylbutadiene), poly(2-butylbutadiene), polypentenylene, polynorbornene, styrene-isoprene-styrene triblock copolymer, and polyoctenylene.

11. The process of claim 1 wherein a thickness of the multilayered oxygen barrier layer is from about 5 to about 100 μm.

12. The process of claim 1 wherein the multilayered oxygen barrier layer has a layered structure as follows: first oxygen barrier resin sublayer/oxygen absorbing resin layer/second oxygen barrier resin sublayer.

13. The process of claim 1 wherein the moisture resistant resin layer has a moisture vapor transmission rate of about 40·30 μm/m2 day or less at a temperature of about 40° C. and a relative humidity of about 90%.

14. The process of claim 1 wherein the moisture resistant resin layer is made of a resin identical to the melted resin.

15. The process of claim 1 wherein the container is retortable.

* * * * *